US008825820B2

(12) United States Patent
Gerber et al.

(10) Patent No.: US 8,825,820 B2
(45) Date of Patent: Sep. 2, 2014

(54) NETWORK AWARE APPLICATION MANAGEMENT

(75) Inventors: Alexandre Gerber, Madison, NJ (US); Carsten Lund, Berkeley Heights, NJ (US); Jacobus Van der Merwe, New Providence, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 899 days.

(21) Appl. No.: 12/562,826

(22) Filed: Sep. 18, 2009

(65) Prior Publication Data

US 2011/0072127 A1 Mar. 24, 2011

(51) Int. Cl.
| | | |
|---|---|---|
| *G06F 15/16* | (2006.01) | |
| *G06F 15/173* | (2006.01) | |
| *H04L 12/26* | (2006.01) | |
| *H04L 29/08* | (2006.01) | |
| *G06F 11/30* | (2006.01) | |
| *G06F 11/34* | (2006.01) | |

(52) U.S. Cl.
CPC ............ *H04L 43/08* (2013.01); *H04L 43/0876* (2013.01); *H04L 67/2852* (2013.01); *G06F 11/3003* (2013.01); *G06F 11/3051* (2013.01); *G06F 11/3466* (2013.01)
USPC ............ 709/223; 709/224; 709/235; 709/242

(58) Field of Classification Search
CPC . H04L 43/08; H04L 43/0876; H04L 67/2852; G06F 11/3003; G06F 11/3051; G06F 11/3466
USPC .................. 709/223, 224, 226, 229, 235, 242
See application file for complete search history.

(56) References Cited

U.S. PATENT DOCUMENTS

| | | | |
|---|---|---|---|
| 5,859,978 A | 1/1999 | Sonderegger et al. | |
| 6,085,243 A | 7/2000 | Fletcher et al. | |
| 6,269,401 B1 * | 7/2001 | Fletcher et al. | 709/224 |
| 6,510,466 B1 | 1/2003 | Cox et al. | |
| 6,591,290 B1 | 7/2003 | Clarisse et al. | |
| 6,944,798 B2 * | 9/2005 | Stephenson et al. | 714/47.2 |
| 7,496,661 B1 * | 2/2009 | Morford et al. | 709/224 |
| 7,843,843 B1 * | 11/2010 | Papp et al. | 370/252 |
| 2005/0273456 A1 * | 12/2005 | Revanuru et al. | 707/1 |
| 2007/0147269 A1 * | 6/2007 | Ettle et al. | 370/254 |
| 2007/0192860 A1 * | 8/2007 | Hiscock | 726/23 |
| 2008/0288580 A1 * | 11/2008 | Wang et al. | 709/203 |
| 2010/0061264 A1 * | 3/2010 | Campbell et al. | 370/253 |
| 2010/0091676 A1 * | 4/2010 | Moran et al. | 370/252 |

* cited by examiner

*Primary Examiner* — Brian J Gillis
(74) *Attorney, Agent, or Firm* — Akerman LLP; Michael K. Dixon; Roy P. Zachariah

(57) ABSTRACT

A method of managing a network application includes identifying a network path for the network application, obtaining network performance measurements along the network path, obtaining application performance information for the network application, and extracting infrastructure specific information for the infrastructure supporting the network application. The method further includes correlating the application performance information, network performance measurements, and the infrastructure specific information to identify a performance issue affecting the network application, and modifying the application behavior, the network behavior, or any combination thereof in response to the performance issue.

20 Claims, 5 Drawing Sheets

NETWORK AWARE APPLICATION MANAGEMENT

FIELD OF THE DISCLOSURE

The present disclosure generally relates to communications networks, and more particularly relates to network aware application management.

BACKGROUND

Communications networks, such as the Internet, carry a wide variety of traffic. For example, network applications such as email, world wide web, Voice over Internet Protocol (VoIP), multimedia traffic, and many others require access to the network. Different network applications place different demands on the network, as well as presenting different security challenges. For example, VoIP and other real-time data streams require packets to be consistently delivered with relatively short delays, whereas email can tolerate longer delays with much more variability between packets. Efficient use of the network for all network applications requires recognizing the needs of each traffic flow as it traverses the network and maintaining the required performance for each of the various network applications.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
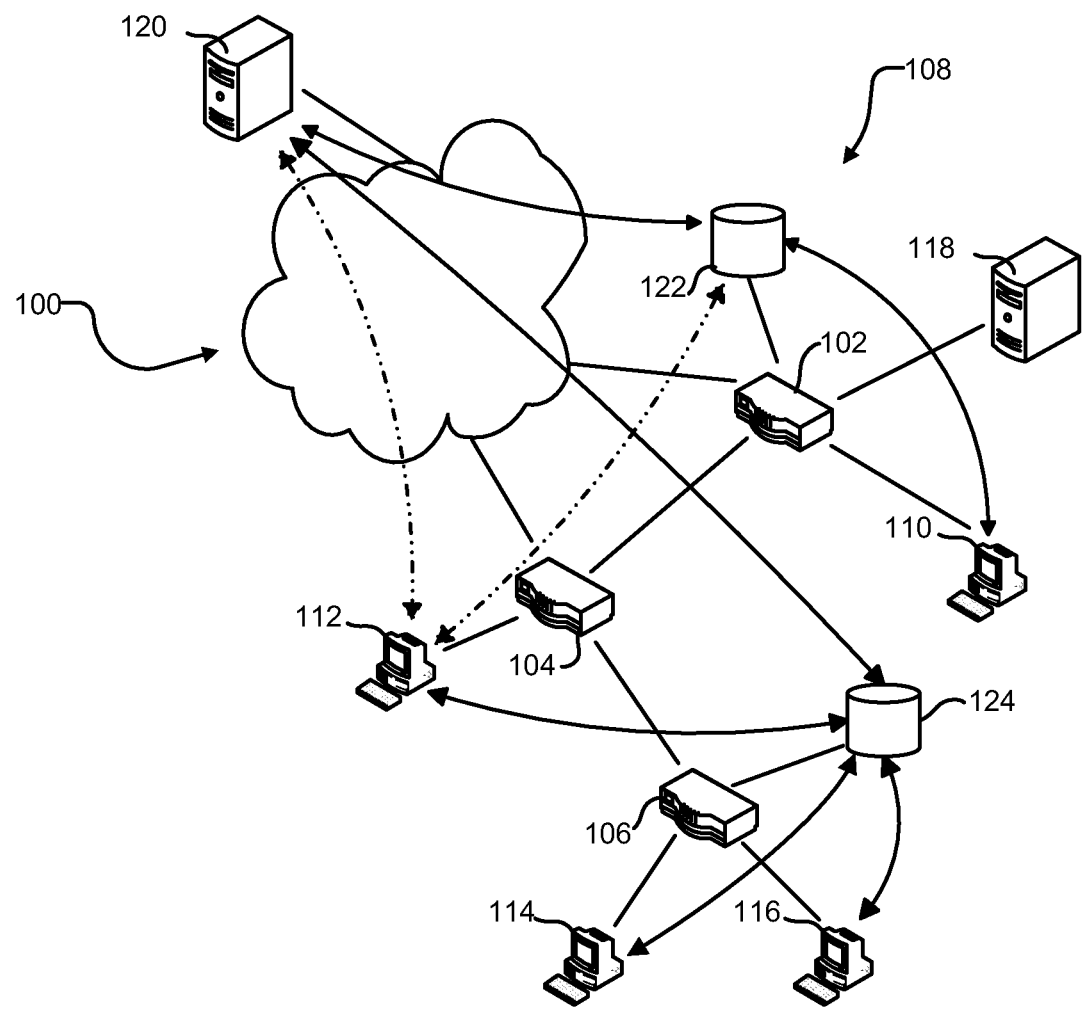
FIG. 1 is a block diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116. AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
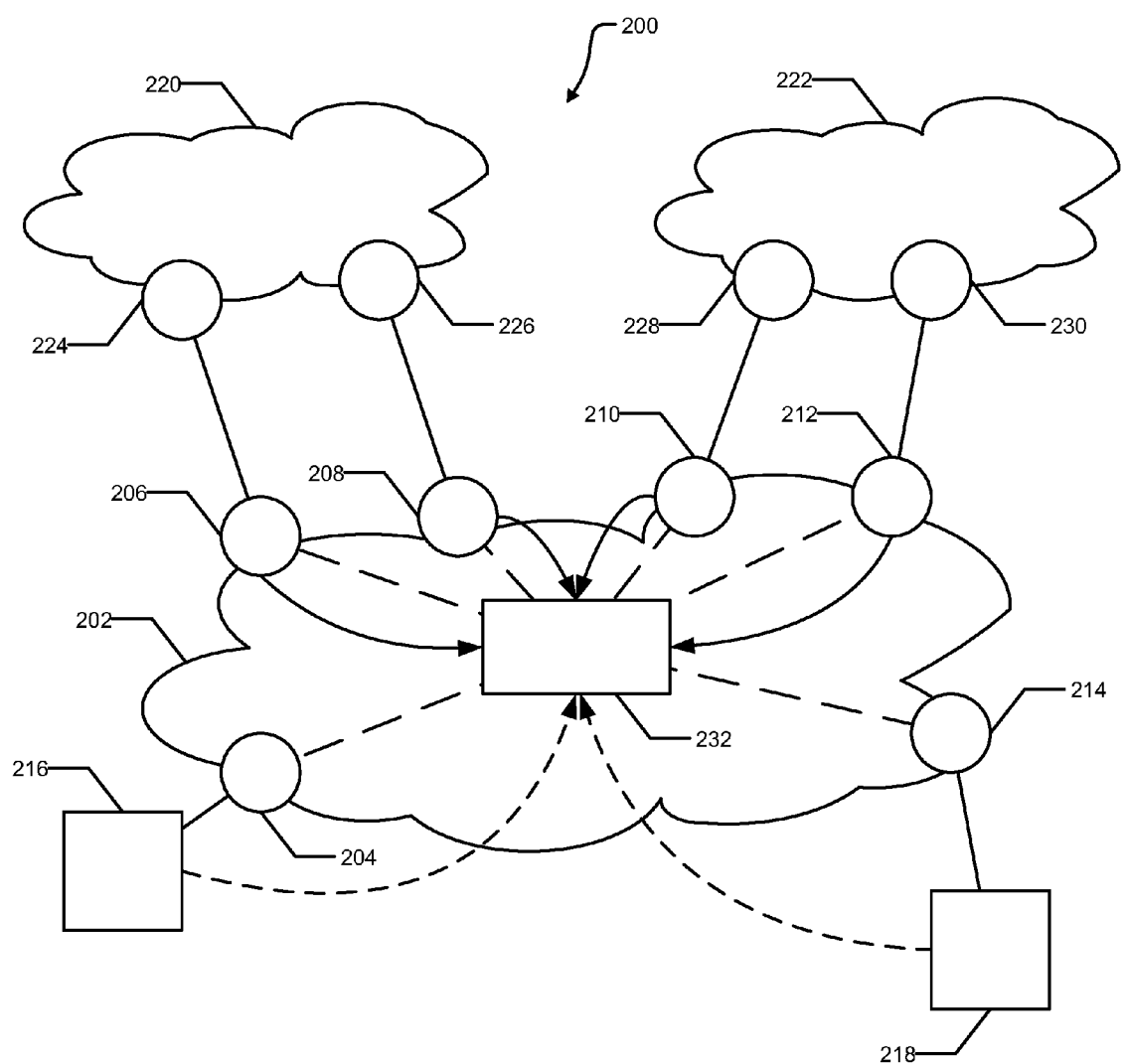
FIG. 2 is a block diagram illustrating an anycast CDN system in accordance with one embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204, 206, 208, 210, 212, and 214. The provider edge routers 204, 206, 208, 210, 212, and 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Anycast CDN system 200 can also include a route controller 232. The route controller 232 can exchange routes with provider edge routers 206, 208, 210, and 212 within the CDN provider network 202. As such, the route controller 232 can influence the routes selected by the provider edge routers 206, 208, 210, and 212. Additionally, the route controller 232 can receive load information from cache servers 216 and 218.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206 though 212. Provider edge routers 206, 208, 210, and 212 can direct traffic addressed to the anycast address to either of the cache servers 216 and 218 based on the routes provided by the route controller 232. Additionally, the provider edge routers 206, 208, 210, and 212 can advertise the anycast address to AS 220 and to AS 222. The route controller 232 can manipulate the route provided to provider edge routers 206, 208, 210, and 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. Anycast traffic entering the CDN provider network 202 at provider edge router 206 may be directed to cache server 216 while anycast traffic entering at provider edge router 208 may be directed to cache server 218. Internal routing changes within AS 220 can cause traffic from a client system within AS 220 to be shifted from cache server 216 to cache server 218, resulting in disruptions to persistent and/or secure connections. As such, it is undesirable to provide an anycast addresses to client systems within an unstable network that can be subjected to frequent internal routing changes.

Figure 3:
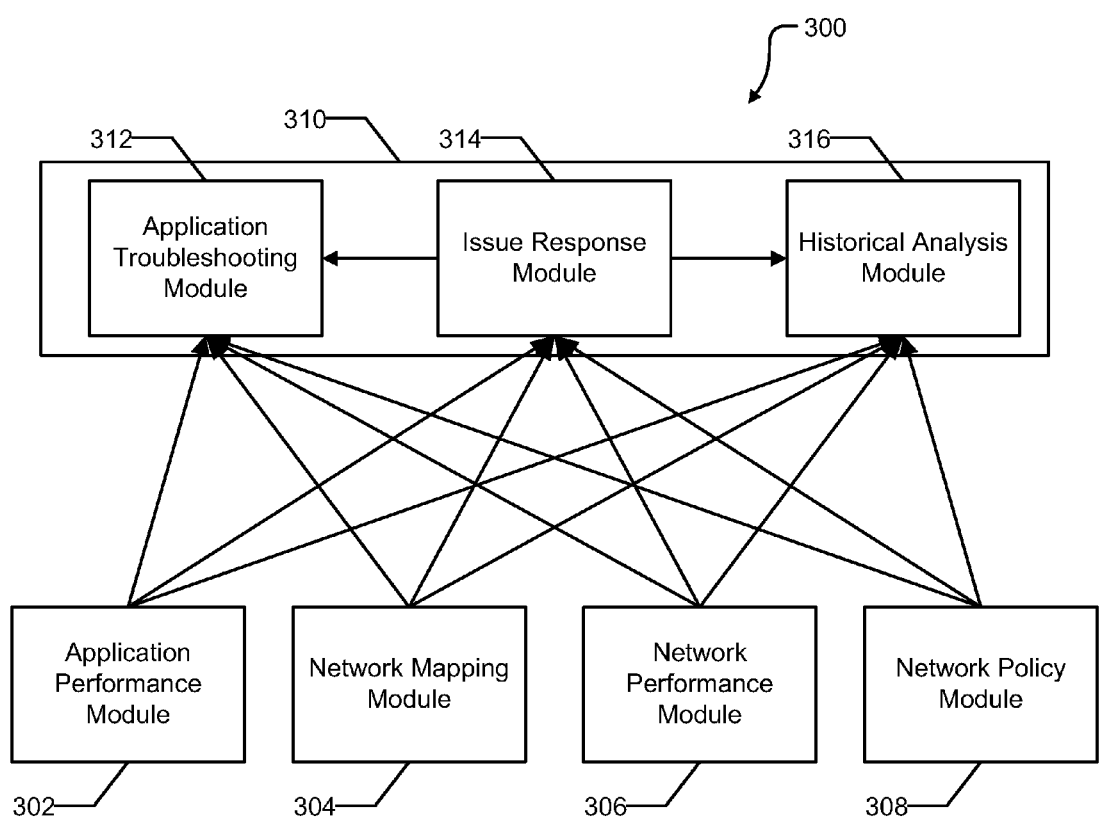
FIG. 3 is a block diagram illustrating a network application management system in accordance with one embodiment of the present disclosure.

FIG. 3 illustrates an exemplary system for network application management, generally designated 300. Network application management system 300 can include several monitoring modules for monitoring various aspects of the network including an Application Performance Module 302, a Network Mapping Module 304, a Network Performance Module 306, and a Network Policy Module 308.

The Application Performance Module 302 can monitor end-to-end performance of a network application. The network application can be a content delivery network, a real-time multicast of audio and/or video content, a web server, online gaming, or another application requiring network communication. For example, the Application Performance Module 302 can monitor a number of dropped packets, response time, latency, data transfer rates, and the like.

The Network Mapping Module 304 can determine network trajectories of specific network traffic, such as network traffic related to the network application. The Network Mapping Module 304 can collect flow level information from a plurality of network elements across all network links and filter based on specific traffic characteristics to identify the network elements that carry the network traffic for the network application. Specific traffic characteristics can include source address, destination address, source port number, destination port number, MPLS route target, or the like. Alternatively, the Network Mapping Module 304 can compute the network trajectory based on ingress and egress points and the network routing information.

The Network Performance Module 306 can monitor network metrics along the network trajectory for the network application. The Network Performance Module 306 can monitor the network hardware along the network trajectory. For example, the Network Performance Module 306 can monitor bandwidth utilization, link capacity, packet queue utilization, and the like. Additionally, the Network Performance Module 306 can monitor performance information specific to the application infrastructure such as the servers that support the application. The infrastructure specific information can include processor utilization, memory utilization, storage utilization, number of concurrent processes, number of concurrent connections, and the like. The Network Policy Module 308 can provide information about network policies.

Additionally, Network Application Management System 300 can include a Correlation Module 310. Correlation Module 310 can correlate the information from monitoring modules 302, 304, 306, and 308 to isolate and troubleshoot an application performance issue or to react to network conditions. Correlation Module 310 can include an Application Troubleshooting Module 312, an Issue Response Module 314, and a Historical Analysis Module 316. The Historical Analysis Module 316 can identify changes in the application performance compared to past application performance. The Application Troubleshooting Module 312 can identify a cause of the change in the application performance, such as identifying a congested network component, or a malfunctioning application resource. The Issue Response Module 314 can modify the behavior of the network or the network application to isolate the cause and/or respond to the changes in the application performance. For example, the Issue Response Module 314 can modify routing tables to direct traffic around a congested network component. In another example, the Issue Response Module 314 may modify the request allocation of a CDN to direct requests away from a malfunctioning cache server.

Application Performance Module 302, Network Mapping Module 304, Network Performance Module 306, Network Policy Module 308, Correlation Module 310, Application Troubleshooting Module 312, Issue Response Module 314, and Historical Analysis Module 316 can be implemented in hardware, software, or any combination thereof. Each module may include one or more computer systems. When a module includes more than one computer system, the functions of the module can be distributed across the multiple computer systems in a symmetric manner, that is each computer system performs the same type of tasks, or in an asymmetric manner, that is two computer systems of the module may perform different tasks.

By way of an example, a content delivery application can experience a drop in performance. The drop in performance can include an increase in response time and/or a decrease in data transfer rates. Based on the information collected by the Application Performance Module 308, the Historical Analysis Module 316 can identify the drop compared to past behavior of the content delivery application. Information collected by the Network Mapping Module 304 and the Network Performance Module 306 can identify the performance of network elements along the network path. Based on this information, the Application Troubleshooting Module 312 may identify a network link or a router that is congested, resulting in decreased bandwidth and possibly dropped packets. As a result, the Issue Response Module 314 may signal the content delivery network to redirect incoming requests to a different cache server to avoid the congested network element. Additionally, the Issue Response Module 314 may notify a route controller to modify the routing of traffic to avoid the congested network element.

Figure 4:
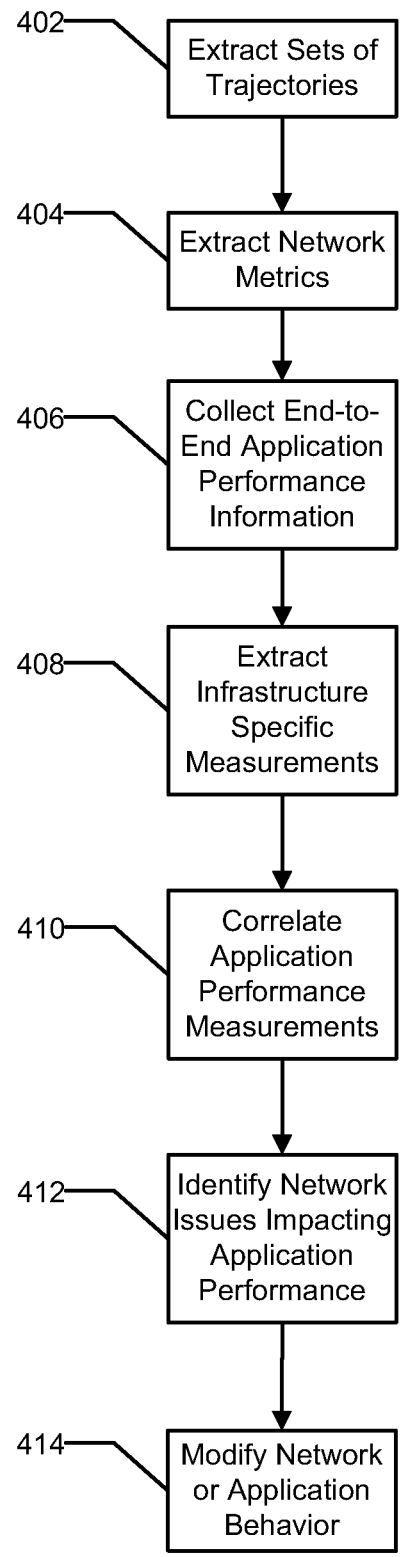
FIG. 4 is a flow diagram illustrating an exemplary method of managing network applications in accordance with one embodiment of the present disclosure.

FIG. 4 illustrates an exemplary method of managing network applications. At 402, the system can extract network trajectories. For example, the system can identify a set of network paths along which traffic between a client and a server may travel. At 404, the system can extract network metrics. For example, the system may determine the performance of network elements, such as packet throughput, number of dropped packets, link utilization, and the like, for the network elements along the network paths. At 406, the system can collect end-to-end application performance information. For example, the system can collect response time, data transfer rates, and the like for a network application. At 408, the system can collect infrastructure specific measurements. For example, the system can determine server load, number of requests being served, cache misses, page faults, and the like.

At 410, the system can correlate the collected data, and at 412, the system can identify network issues that are affecting the application performance. At 414, the system can modify the behavior of the network application and/or the network to mitigate the network issue. Additionally, the system can provide an alert to network administrators or service personnel.

Figure 5:
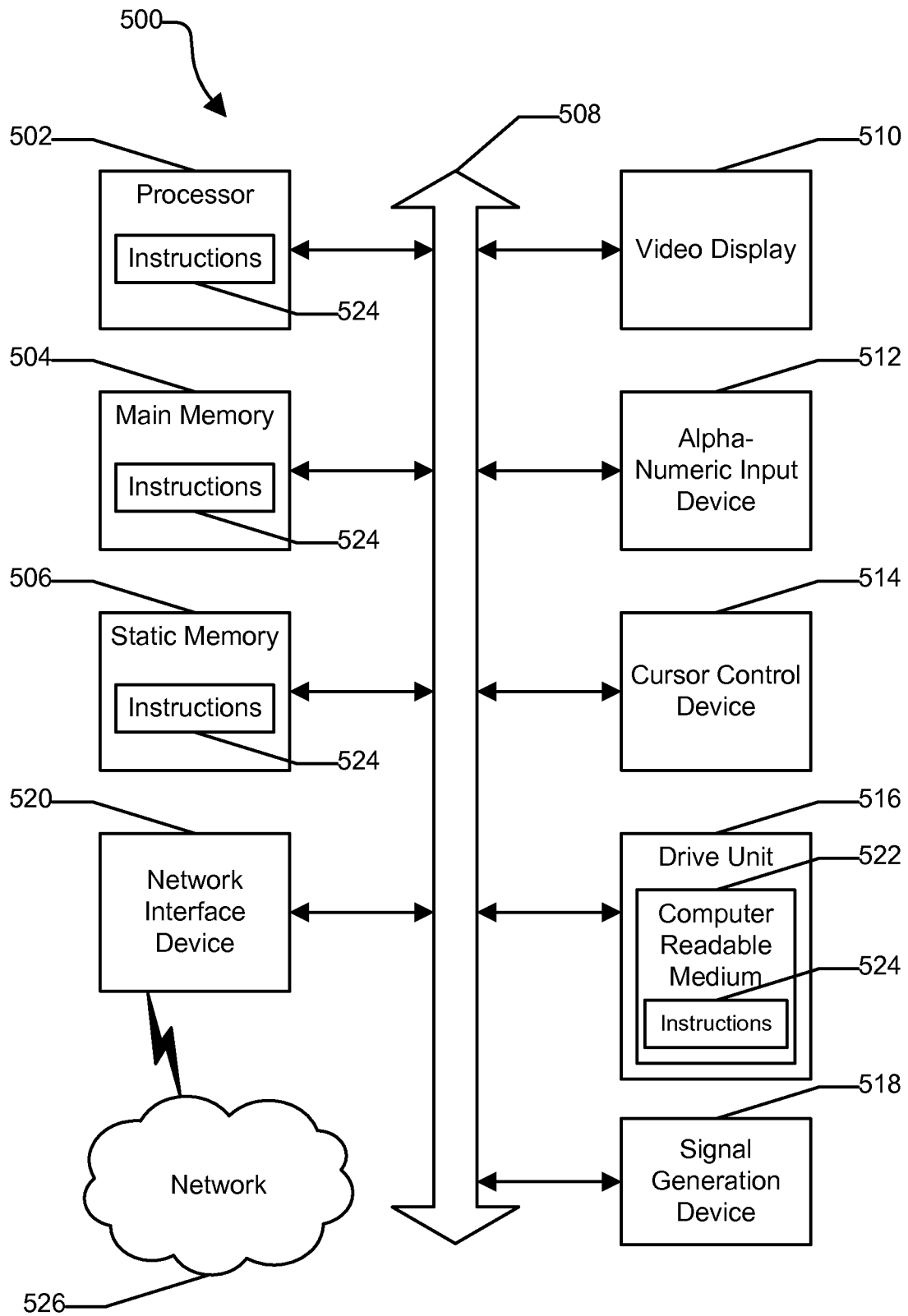
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices. Examples of computer system 500 can include server 120, client system 112, cache server 122, DNS server 118, or a computer system component of any one of modules 302, 304, 306, 308, 312, 314, and 316.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid-state display, or a cathode ray tube (CRT). Additionally, the computer system 500 may include an input device 512 such as a keyboard, and a cursor control device 514 such as a mouse. Alternatively, input device 512 and cursor control device 514 can be combined in a touchpad or touch sensitive screen. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of managing a network application, comprising:
    identifying a network path for the network application;
    obtaining network performance measurements along the network path;
    obtaining application performance information for the network application;
    extracting infrastructure specific information for infrastructure supporting the network application;
    correlating the application performance information, network performance measurements, and the infrastructure specific information to identify a performance issue affecting the network application; and
    in response to the performance issue:
        modifying a behavior of the application;
        modifying a behavior of a network element of the network path; and
        modifying the infrastructure specific information.

2. The method of claim 1 wherein identifying a network path includes collecting flow level information from a plurality of network elements and filtering based on traffic characteristics to identify which network elements comprise the network path.

3. The method of claim 1 wherein the network performance measurements include one of bandwidth utilization, link capacity, packet queue utilization, and any combination thereof.

4. The method of claim 1 wherein the application performance information includes one of a number of dropped packets, response time, latency, data transfer rates, and any combination thereof.

5. The method of claim 1 wherein modifying the behavior of the application includes modifying a request allocation to direct requests away from a malfunctioning server.

6. The method of claim 1, wherein modifying the behavior of the network element includes modifying routing tables to direct traffic around a congested network component.

7. The method of claim 1 wherein the network application comprises a content delivery network application.

8. A system for managing a network application, comprising:
    a network mapping module that at least identifies a network path for the network application;
    a network performance module that at least:
        obtains network performance measurements along the network path; and
        obtains infrastructure specific information for infrastructure supporting the network application;
    an application performance module that at least obtains application performance information;
    a hardware implemented correlation module that at least correlates the application performance information, network performance measurements, and the infrastructure specific information to identify an application performance issue; and
    an issue response module that at least responds to the application performance issue to:
        modify a behavior of the application;
        modify a behavior of a network element of the network path; and
        modify the infrastructure specific information.

9. The system of claim 8 wherein identifying a network path includes collecting flow level information from a plurality of network elements and filtering based on traffic characteristics to identify which network elements comprise the network path.

10. The system of claim 8 wherein the network performance measurements include one of bandwidth utilization, link capacity, packet queue utilization, and any combination thereof.

11. The system of claim 8 wherein the infrastructure specific information includes one of processor utilization, memory utilization, storage utilization, number of concurrent processes, number of concurrent connections, and any combination thereof.

12. The system of claim 8, further comprising modifying a behavior of the application, wherein modifying the behavior of the application includes modifying the request allocation of an application to direct requests away from a malfunctioning server.

13. The system of claim 8 wherein modifying the behavior of the network element includes modifying a routing tables of the network element to direct traffic around a congested network component.

14. The system of claim 8 wherein the network application comprises a real time multicast application.

15. A non-transitory computer readable medium comprising a plurality of instructions to manipulate a processor, the plurality of instructions comprising:

instructions to identify a network path for a network application;

instructions to obtain network performance measurements along the network path;

instructions to obtain application performance information for the network application;

instructions to obtain infrastructure specific information for infrastructure supporting the network application; and instructions to correlate the application performance information, network performance measurements, and the infrastructure specific information to identify a performance issue related to the network application;

instructions to modify a behavior of the application in response to the application performance issue;

instructions to modify a behavior of a network element of the network path in response to the application performance issue; and instructions to modify the infrastructure specific information in response to the application performance issue.

16. The computer readable medium of claim 15 wherein identifying a network path includes one of (i) calculating a network path based on an ingress point, an egress point, and network routing information, and (ii) collecting flow level information from a plurality of network elements and filtering based on traffic characteristics to identify which network elements comprise the network path.

17. The computer readable medium of claim 15 wherein the application performance information includes one of a number of dropped packets, response time, latency, data transfer rates, and any combination thereof.

18. The computer readable medium of claim 15 wherein the infrastructure specific information includes one of processor utilization, memory utilization, storage utilization, number of concurrent processes, number of concurrent connections, and any combination thereof.

19. The computer readable medium of claim 15 wherein modifying the behavior of the application includes modifying the request allocation of an application to direct requests away from a malfunctioning server.

20. The computer readable medium of claim 15 wherein the network application comprises an online gaming application.

* * * * *